(12) United States Patent
Leermakers et al.

(10) Patent No.: US 11,371,686 B2
(45) Date of Patent: Jun. 28, 2022

(54) HIGHLIGHTING A PRODUCT IN A STORE FIXTURE, DISPLAY OR SHELF

(71) Applicant: SIGNIFY HOLDING B.V., Eindhoven (NL)

(72) Inventors: Remco Christianus Wilhelmus Leermakers, Eindhoven (NL); Jan Richard Huisman, Eindhoven (NL); Marcel Vidjaising Somer, Eindhoven (NL); Wessel Van Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/272,300

(22) PCT Filed: Jul. 31, 2019

(86) PCT No.: PCT/EP2019/070608
§ 371 (c)(1),
(2) Date: Feb. 27, 2021

(87) PCT Pub. No.: WO2020/043417
PCT Pub. Date: Mar. 5, 2020

(65) Prior Publication Data
US 2021/0396378 A1     Dec. 23, 2021

(30) Foreign Application Priority Data
Aug. 31, 2018 (EP) .................................. 18192044

(51) Int. Cl.
*F21V 23/04* (2006.01)
*A47F 3/00* (2006.01)
*F21W 131/405* (2006.01)

(52) U.S. Cl.
CPC .......... *F21V 23/0471* (2013.01); *A47F 3/001* (2013.01); *F21W 2131/405* (2013.01)

(58) Field of Classification Search
CPC ...... F21V 23/0471; F21V 23/04; A47F 3/001; F21W 2131/405; H05B 47/105; F21Y 2113/00
See application file for complete search history.

(56) References Cited

U.S. PATENT DOCUMENTS

| | | |
|---|---|---|
| 3,514,670 A | 5/1970 | Isaacs |
| 5,980,058 A | 11/1999 | Guess et al. |
| 6,160,351 A | 12/2000 | Han et al. |

(Continued)

*Primary Examiner* — Kevin Quarterman

(57) ABSTRACT

A lighting device is presented for highlighting a first product over a second product placed in a first and a second section respectively of a store fixture, display or shelf to draw a shopper's attention to the first product, the lighting device comprising: a first and a segment, adjacent to each other, arranged for providing a first light output for illuminating the first product and a second light output for illuminating the second product respectively, a controller arranged for changing an operational mode of the lighting device from a normal lighting mode to a highlighting mode based on a signal indicating presence of a field; wherein in both the normal lighting mode and the highlighting mode, the first segment and the second segment provide illumination, and wherein in the highlighting mode, the first segment highlights the first product over the second product.

7 Claims, 4 Drawing Sheets

(56) References Cited

U.S. PATENT DOCUMENTS

| | | |
|---|---|---|
| 6,459,919 B1 | 10/2002 | Lys et al. |
| 8,248,214 B2 | 8/2012 | Moseley |
| 8,882,286 B1 | 11/2014 | Delgado Antunez |
| 9,890,993 B1 | 2/2018 | Sandberg |
| 10,251,242 B1 * | 4/2019 | Rosen .................. H05B 47/105 |
| 10,520,352 B1 * | 12/2019 | Shi ........................ A47F 3/0426 |
| 10,591,348 B1 * | 3/2020 | Shi ........................ A47F 3/0408 |
| 2009/0189775 A1 | 7/2009 | Lashina et al. |
| 2010/0213876 A1 | 8/2010 | Adamson et al. |
| 2012/0036726 A1 | 2/2012 | Fidan et al. |
| 2012/0105424 A1 * | 5/2012 | Lee ........................ G07F 9/0235<br>345/212 |
| 2015/0123547 A1 | 5/2015 | Fushimi |
| 2016/0360594 A1 | 12/2016 | Chemel |

\* cited by examiner

ID="1" HIGHLIGHTING A PRODUCT IN A STORE FIXTURE, DISPLAY OR SHELF

CROSS-REFERENCE TO PRIOR APPLICATIONS

This application is the U.S. National Phase application under 35 U.S.C. § 371 of International Application No. PCT/EP2019/070608, filed on Jul. 31, 2019, which claims the benefit of European Patent Application No. 18192044.8, filed on Aug. 31, 2018. These applications are hereby incorporated by reference herein.

FIELD OF THE INVENTION

The invention relates to store lighting. In particular, the invention relates to a lighting device, a method and a computer program product for highlighting a product in a store fixture, display or shelf.

BACKGROUND OF THE INVENTION

The notion of 'green world' describes a sustainable way of living, where nature is being considered important besides consumption and production, where people use recyclable materials and natural energy. One of the most important things to protect our environment is to find ways to reduce waste and move towards a more waste-free lifestyle Waste pollutes our environment and uses up our planet's finite resources. Specifically, in a retail environment, waste can be a serious issue, given the fact that the retail store has to deal with large numbers of individual items and therefore the retail store can potentially produce a lot of waste.

Lighting is an important ingredient in the retail store, which can help in creating an atmosphere to encourage shopping and making the interior look interesting and/or appealing. Typically, lighting used in the retail store is static such that a default predetermined light settings is used for the store. Store owners may also use a lighting system that is centrally controlled, for example with control located at a national headquarter instead of at individual store locations.

In the context of green world and to reduce waste, specifically in the retail environment, it is desirable to provide a lighting setup that can play an important role in reducing waste and help in making our environment green.

US 2015/123547 A1 discloses a lighting system which includes: a light source for lighting display and passage spaces; a first detector for detecting presence or absence of part of a human body in a first detection area; and a second detector for detecting human presence or absence in a second detection area. The second detection area contains a whole or part of the passage space. The first detection area is nearer to the article than the second detection area. A controller controls the light source so that: in a case of detecting human absence, the light source is operated at a reduced light output level; if the second detector detects human presence, illuminance in the display space is increased; and if the first detector detects human presence, illuminance in each of the passage space and the display space is increased.

US20090189775A1 discloses a highlighting method and an interaction system include at least one controllable light emitting source linked to an item; and a processor configured to turn on the controllable light emitting source in response to user selection of the item. The controllable light emitting source may be embedded in a mat or a strip. The mat may include a matrix of photo detectors or pressure sensors configured to detect the base or footprint of the item when placed on the mat. The periphery of the product or the footprint may be illuminated upon selecting the product.

SUMMARY OF THE INVENTION

The inventors have realized that a simple way of reducing waste is to attract a shopper's attention, using a lighting system, to products which would benefit from being sold more quickly than others. A customer, looking to shop in a retail store or in a shop, can be named as a shopper. For example, by selling products that are near their expiry date first, compared to products of the same type that have an expiry date which is further into the future, it can be avoided that products pass their expiry date and are no longer sold but instead need to be discarded off. However, most lighting systems in retail stores merely provide functional background lighting which allows shoppers to see all products as well as, for example, the floor, walls, etc. to help the shopper traverse the retail store in a safe and efficient manner. Such functional background lighting does not allow one product to be highlighted over another product.

In some retail stores, spot lights may be used to provide aesthetically pleasing light for a section of the store. Spot lights can project a bright beam of light onto a store section, to enhance the beauty of, for example, bread, fish or meat products or to make clothing items sparkle. Such lighting is however static and cannot be used to solve the waste reduction problem. Furthermore, adapting such a system to allow the highlighting of one product over another in a manner suitable for causing waste reduction, is difficult and expensive. Using spot lights for highlighting (individual) products in the retail store will be limited with respect to, at least, the number of products that can be highlighted, how close to each other products would have to be positioned, etc. Several spot lights result in an expensive lighting system.

According to a first aspect, a lighting device is presented for highlighting a first product over a second product placed in a first and a second section respectively of a store fixture, display or shelf to draw a shopper's attention to the first product. The lighting device comprises: a first segment, a second segment and a controller. The first segment is arranged for providing a first light output for illuminating the first product. The second segment is arranged for providing a second light output for illuminating the second product. The first and the second segment are adjacent to each other. The controller is arranged for changing an operational mode of the lighting device from a normal lighting mode to a highlighting mode based on a signal indicating presence of a field. In both the normal lighting mode and the highlighting mode, the first segment and the second segment provide illumination. However, in the highlighting mode, the first segment highlights the first product over the second product.

The lighting device comprises a controller which is arranged for switching the operational mode of the lighting device from the normal lighting mode to the highlighting mode. A shopper's attention is drawn towards the first product by highlighting it over the second product. Highlighting can make a product stand out amongst other products which otherwise will not receive as much attention from shoppers and can therefore may be left unsold until discarded. Further, with highlighting, the overall appearance of products which are, e.g. old, near to their expiry date, have less attractive packaging, are out of season etc., may be made more appealing and/or attractive.

Multiple lighting devices may be connected and/or a lighting device may comprise more than two segments to allow, when installed in a store fixture, display or shelf, to highlight the first product over the second product by adapting the light emitted towards other products than the first product. In other words, instead of highlighting the first product by, for example, increasing the light intensity with which the first product is illuminated; the light emitted towards the second product (and e.g. other products) may, for example, be dimmed down.

In various embodiments, the controller is arranged for, when the lighting device is operating in the highlighting mode, modifying an intensity and/or modifying a color of the light output of the first segment. When a product is highlighted by changing the intensity of the first light output compared to the second light output, the product can be made to stand out. Since the product receives, preferably, a higher intensity light, the product becomes more visible to the shopper. In an advanced embodiment, intensity can be changed with respect to time and can follow a predetermined pattern. Another possible way of highlighting is by changing the color of the first light output with respect to the second light output. For example, a white light illuminating the first product compared to a non-white light illuminating the second product can make the first product stand out compared to the second product. Similarly, saturation of the color can be adjusted to perform highlighting.

In an embodiment, the lighting device is comprised in a housing, the housing arranged for attaching the lighting device to the store fixture, display or shelf such that the light emitted by the first segment reflects of at least a shopper facing portion of the first product. In this embodiment, the shopper facing portion of the first product is in relation to the shopper facing portion of the store display. The position of the lighting device in the store display is chosen such that the highlighting of the first product is visible to the shopper.

In an embodiment, the lighting device further comprises a sensing device arranged for sensing the field and to generate the signal indicative of the presence of the field.

In an embodiment, the sensing device is arranged for sensing a magnetic field and further arranged for generating the signal indicative of the presence of the magnetic field. The sensing device may be a magnetically operable switch. In a further embodiment, the housing provides a region to receive a magnetic key card; and the sensing device is arranged for sensing the field when the magnetic key card is provided in the housing. The sensing device may further be arranged for sensing at least one or more of the strength of the field, change of the strength of the field in a time period, interval of presence of the field.

One of the advantages of using the magnetically operable switch is that the unwanted switching of the operational mode of the lighting device from the normal lighting mode to the highlighting mode can be avoided. For example, with a visible button or switch, it is possible that a shopper can either intentionally or accidentally cause, e.g., by pressing the push button, the switching of the operational mode. The magnetically operable switch can be a reed contact switch. The position of the magnetically operable switch, e.g., a reed contact switch may be chosen such that the switch is not visible to the shopper and may be activated by the magnetic key card; wherein only a concerned user e.g., the owner/staff of the retail store, can use the magnetic key card and he knows where the magnetically operable switch, e.g., a reed contact switch is placed.

In an alternative embodiment, the sensing device is a radio-frequency identification, RFID, reader. In an embodiment, the controller is arranged for changing the operational mode of the lighting device from the normal lighting mode to the highlighting mode when the RFID reader receives a predetermined signal indicative of the presence of an RFID tag.

The RFID reader is arranged for detecting least one of active tag, passive tag and semi passive tag. When the sensing device is an RFID reader, the controller may be arranged for detecting a predetermined signal indicative of the presence of an RFID tag. The RFID reader sends a signal to the tag and reads its response. If the RFID reader detects presence of a predetermined RFID tag (e.g. based on an identifier of the RFID tag), the controller is arranged for switching the operational mode of the lighting device. Only the user e.g., the owner and/or one or more staff of the retail store, will have the access to the RFID tag(s) that can control the lighting device, which prevents the unwanted switching of the lighting device to the highlighting mode. The sensing device may be a near-field communication (NFC) reader, which allows smart devices such as mobile phone to act as an NFC tag. As NFC is limited to closed proximity, the user e.g., the owner/staff of the retail store, needs to be in proximity of the NFC reader.

Optionally, there is a further security feature which locks and unlocks the lighting device, such that in a locked mode the lighting device will not respond to the presence of the field and in the unlocked mode the lighting device will respond to the presence of the field. For example, the lighting device may further comprise an infrared sensor, which causes the lighting device to operate in the unlocked mode while an infrared signal is present (i.e. measured by the infrared sensor), or for a predefined period of time when an infrared signal (e.g. according to a predetermined pattern, signal strength) is measured by the infrared sensor, and to operate the lighting device in the locked mode otherwise.

According to a second aspect, a store fixture, display or shelf is presented, comprising: a first section and a second section for holding a first product and a second product respectively, and a lighting device according to the first aspect.

According to a third aspect, a method is presented for highlighting a first product over a second product placed in a first and a second section respectively of a store fixture, display or shelf to draw a shopper's attention to the first product, the method comprising: providing a first light output by a first segment of a lighting device for illuminating the first product, providing a second light output by a second segment of the lighting device, adjacent to the first segment, for illuminating the second product, sensing a field and, based on said sensing, generating a signal indicative of the presence of the field; and changing an operational mode of the lighting device from a normal lighting mode to a highlighting mode based on the signal indicative of the presence of the field; wherein in both the normal lighting mode and the highlighting mode, the first segment and the second segment provide illumination, and wherein in the highlighting mode, the first segment highlights the first product over the second product.

According to a fourth aspect, a computer program product is presented comprising instructions configured to cause a lighting device to execute the steps of the method according to the third aspect.

DETAILED DESCRIPTION OF EMBODIMENTS

Figure 1:
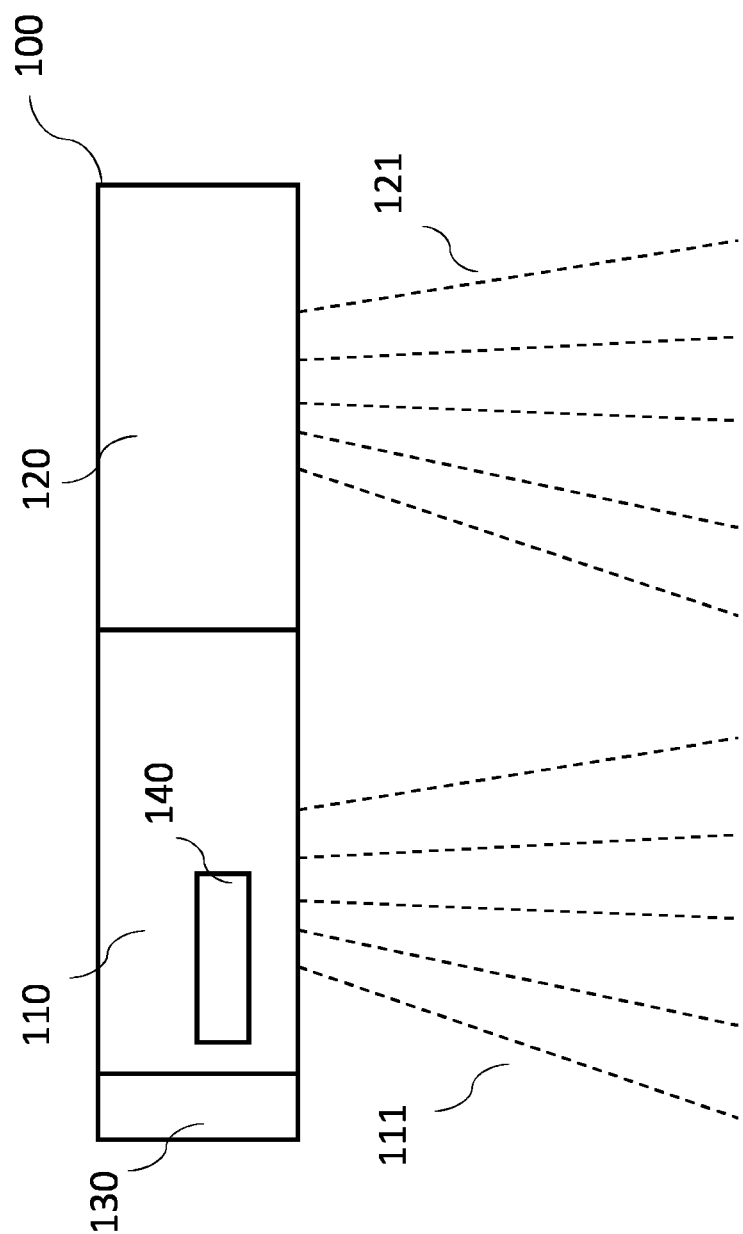
FIG. 1 schematically shows a lighting device according to the first aspect.

FIG. 1 schematically shows the lighting device according to the first aspect. The lighting device 100 comprises a first segment 110 and a second segment 120, adjacent to each other. The first segment 110 is arranged for providing a first light output 111 and the second segment 120 is arranged for providing a second light output 121. The first and the second segment 110, 120 each comprise at least one light source (not shown) and driver circuitry to power the at least one light source (not shown). Both segments may comprise an equal number of light sources or alternatively may comprise different number of light sources. Furthermore, both segments may comprise the same type of light sources, e.g., LED, fluorescent and incandescent or may comprise different types.

The lighting device 100 further comprises a controller 130. The controller 130 is arranged for changing an operational mode of the lighting device 100 from a normal lighting mode to a highlighting mode based on a signal indicative of the presence of a field. In this exemplary figure, the controller 130 is placed adjacent to the first segment 110. The controller 130 can be placed elsewhere. The controller 130 may, for example, be placed adjacent to the second segment 120 or in between the first segment 110 and the second segment 120. Furthermore, the controller 130 may, for example, instead of being physically integrated with the first and second segment of the lighting device 100, be connected remotely to the lighting device 100 (e.g. with a wired/wireless connection). The controller 130 may be implemented in a single unit or in the form of a distributed control function distributed amongst the first segment 110 and second segment 120 of the lighting device 100. Furthermore, the controller 130 may be implemented in the form of software stored on a memory and arranged for execution on a processor, or the controller 130 may be implemented in the form of dedicated hardware circuitry, or configurable or reconfigurable circuitry such as a PGA or FPGA, or any combination of these.

The lighting device 100 further comprises a sensing device 140. The sensing device 140 is arranged for sensing the field and to generate the signal indicative of the presence of the field. In this exemplary figure, the sensing device 140 is placed in the first segment 110. The sensing device 140 can placed elsewhere. The sensing device 140 may be placed, for example, in the second segment 120 or in between the first segment 110 and the second segment 120. Furthermore, the sensing device 140 may be connected remotely to the lighting device 100 (e.g. with a wired/wireless connection). In an embodiment, the controller 130 and the sensing device 140 may be combined in a single unit, or the controller may perform the functions of the sensing device.

Figure 2:
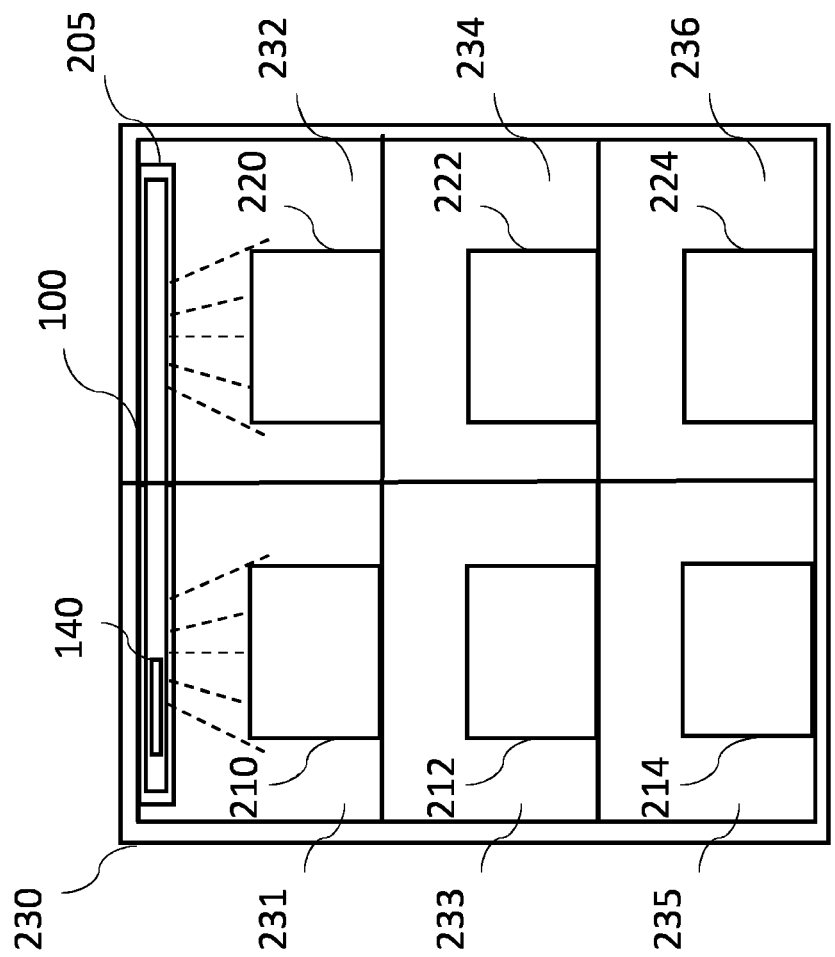
FIG. 2 schematically shows an example of a layout of a store fixture, display or shelf using the lighting device as shown in FIG. 1 to highlight a product, FIG. 3 schematically shows an embodiment of a lighting device and a sensing device which is arranged for sensing a field generated by a key card.

FIG. 2 shows an example of a layout of a store fixture, display or shelf 230 using the lighting device 100. The store display 230 comprises multiple sections 231, 232, 233, 234, 235, 236 holding multiple products 210, 212, 214, 220, 222, 224, respectively. In this example, the first segment 110 of the lighting device 100 is arranged for providing the first light output 111 for illuminating the first section 231 holding the first product 210 and the second segment 120 of the lighting device 100 is arranged for providing the second light output 121 for illuminating the second section 232 holding the second product 220. The lighting device 100 may be placed elsewhere to provide illumination to e.g., sections 233, 234 or sections 235, 236 or any other combination of sections 231, 232, 233, 234, 235, 236. The sections 231, 232, 233, 234, 235, 236 of the store display 230 may be physically separated by a separator as shown in FIG. 2 or the sections 231, 232, 233, 234, 235, 236 may not be physically separated by a separator and may be defined in view of the products which each section holds.

The first product 210 and the second product 220 may belong to the same product type or may belong to different product types. For example, both the first product 210 and the second product 220 may be milk cartons in a grocery store or clothing with the same style and/or color in a fashion store. Alternatively, e.g., the first product 210 may be a yoghurt carton and the second product may be a milk carton in the grocery store or different clothing with different brands, colors and/or designs in the fashion store.

The lighting device 100 may be comprised in a housing 205, wherein the housing 205 is arranged for attaching the lighting device 100 to the store display 230 such that the light emitted by the first segment 110 reflects of at least a shopper facing portion of the first product 210. The shopper facing portion of the first product 210 is in relation to the shopper facing portion of the store display 230.

The lighting device 100, in FIG. 2, is positioned at the top of the first section 231 and the second section 232 to provide illumination to the first and the second product 210, 220. The lighting device 100 may be placed elsewhere, e.g., backside, on the corner etc. as long as the light emitted by the first and second segment of the lighting device 100 reflects, directly or indirectly, of at least shopper facing portions of the first product 210 and the second product 220, respectively.

The lighting device 100 is arranged for being operable in either the normal lighting mode or in the highlighting mode. In the normal lighting mode, the first segment 110 and the second segment 120 are arranged for providing the same light output for illuminating the first product 210 and the second product 220. The light outputs may have the same intensity as perceived by the shopper at the shopper facing portions of the first product 210 and the second product 220. Alternatively, the light outputs may have the same color as perceived by the shopper at the shopper facing portions of the first product 210 and the second product 220. The normal lighting mode may be the commonly used default lighting mode of the lighting device 100, wherein the light output settings are predetermined and based e.g., on at least a user and/or shopper preference, product types which are intended to be illuminated, ambience of the store etc. The lighting device 100 may be arranged for operating in the normal lighting mode when the lighting device 100 is powered on (e.g. when a power cycle occurs).

The lighting device 100 comprises the sensing device 140 arranged for sensing the field and to generate the signal indicative of the presence of the field, wherein the controller is arranged for switching the operational mode of the lighting device 100 from the normal lighting mode to the highlighting mode based on the signal indicating the presence of the field. In an embodiment, the sensing device 140 is arranged for sensing a magnetic field and further arranged for generating a signal indicative of the presence of the magnetic field. According to this embodiment, the sensing device 140 is a magnetically operable switch, e.g., a reed contact switch. The reed contact switch is an electrical switch operated by an applied magnetic field. It may consist of a pair of contacts on ferromagnetic metal reeds in a hermetically sealed glass envelope. The contacts may be normally open, closing when a magnetic field is present, or normally closed and opening when a magnetic field is applied. The switch may be actuated by a coil, making a reed relay, or by bringing a magnet near to the switch.

The magnetically operable switch, e.g., the reed contact switch, is arranged for generating a signal indicating the presence of the magnetic field, wherein in an example, the generation of the signal represents the activation of the magnetically operable switch e.g., the reed contact switch, which is activated by applying the magnetic field.

In an alternative embodiment, the sensing device 140 is a radio-frequency identification, RFID, reader, which uses an electromagnetic field to automatically identify RFID tags. The RFID tag contains electronically-stored information. Two-way radio transmitter-receivers called interrogators or readers send a signal to the tag and read its response; wherein the controller 130 is arranged for changing the operational mode of the lighting device 100 from the normal lighting mode to the highlighting mode when the RFID reader receives a predetermined signal indicating a presence of a RFID tag. Alternatively, the controller 130 is arranged for changing the operational mode when the RFID reader receives a signal indicating the presence of a predetermined RFID tag.

In this embodiment, RFID tags can be either active, battery-assisted semi-passive or passive. An active tag has an on-board battery, periodically transmits its ID signal and may operate hundreds of meters from the RFID reader. A battery-assisted passive (BAP) has a small battery on board and is activated when in the presence of an RFID reader. Passive tags collect energy from a nearby RFID reader's interrogating radio waves.

In a further developed embodiment, the sensing device 140 is a near-field communication (NFC) reader, which can be categorized as a finely-honed version of high frequency RFID.

The sensing device 140 is arranged for sensing at least one or more of the presence, the strength of the field sensed by the sensing device 140, the change in strength of the field within a (predetermined) time period, the interval of presence of the field (e.g. the field being present for one second, then not present for two seconds and finally present again for one second). For the magnetic field, there is one of two ways that the intensity of a magnetic field can be expressed, i.e., magnetic field strength H, measured in amperes per meter (A/m), and magnetic flux density B, measured in Newton-meters per ampere (Nm/A), also called teslas (T). The magnetic field strength corresponds to the density of the magnetic field lines.

The lighting device 100, upon detection of the field, is arranged for switching the operational mode from the normal lighting mode to the highlighting mode. In the highlighting mode, the first product 210 is highlighted over the second product 220. The first product 210 may be placed in different positions with respect to the second product 220 e.g., the first product 210 may be placed in an upper or lower position with respect to the second product 220 or both products 210, 220 may be placed side-by-side etc.

In the highlighting mode, the controller 130 is arranged for modifying at least one characteristic of the first light output 111 of the first segment 110 with respect to the second light output 121 of the second segment 120. In an example, the characteristic of the light output 111 is the intensity of the light output 111. The intensity may be modified from one value to at least a different or, preferably, higher value. The intensity may be modified dynamically, i.e., intensity values changes over time. The change of the intensity may be controlled in an indirect way, e.g., by changing the beam width and/or the beam direction of the light output 111 such that the visual effect perceived by the shopper at the shopper facing portion of the first product 210 is different compared to the visual effect perceived by the shopper at the shopper facing portion of the second product 220.

In an example, the characteristic of the light output 111 is the color of the light output 111. The change of color may correspond to the use of contrasting colors, e.g., white versus non-white colors, saturation of colors etc., for the first light output 111 and the second light output 121. The color may be modified such that the color changes from one value in the color spectrum to another value in the color spectrum. The color may be modified dynamically such that it follows a certain predefined pattern. The change of color may correspond to blinking of the light output 111.

The lighting device 100 may be reset to the normal lighting mode by a power cycle. Alternatively, a timer may be used for resetting the lighting device 100 to the normal lighting mode from the highlighting mode or the lighting device is reset to the normal mode in some other way, including based on a further presence of the same or a different field (e.g. the same key card is presented to cause the lighting device to go back to the normal mode).

The lighting device 100 may be a linear light, e.g., a light strip, or it may be a non-linear light. In an example, the lighting device 100 is a Refrigerated Display case Lighting (RDL) used in retail stores. In this example, the sensing device 140, e.g., reed contact switch, is positioned such that it prevents influencing the light disturbance of the RDL module. In this way, when the module is supplied with the power to provide illumination, the sensing device 140, e.g. the reed contact switch and the corresponding electronic circuit (not shown), is hardly visible. RDL modules are typically powered by a constant voltage power supply of 24V. This voltage is used to power the corresponding electronic circuit, e.g., electronic reed contact circuit. In a preferred embodiment, the bracket of the Refrigerated Display Lighting (RDL) is from a non-ferrous metal.

Figure 3:
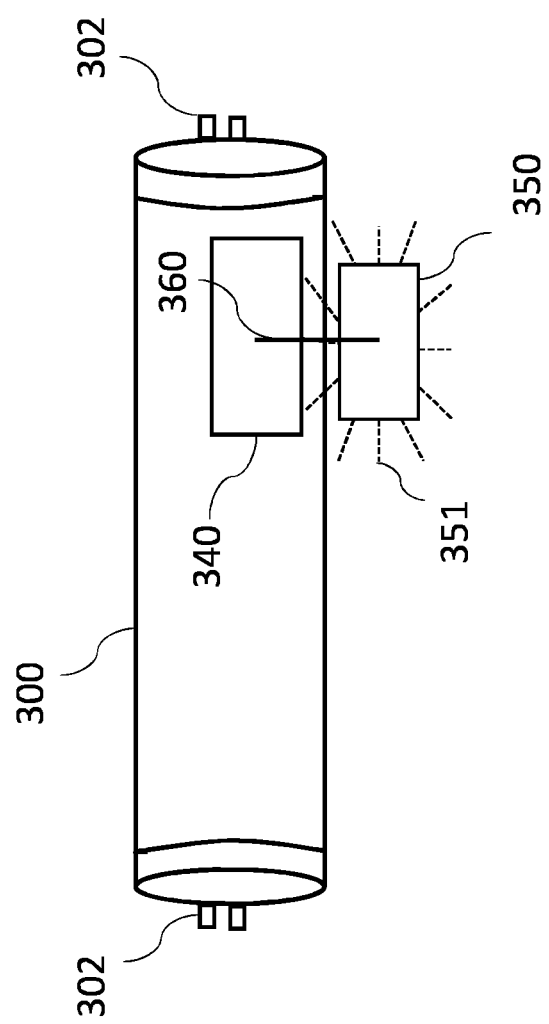

FIG. 3 shows an example implementation of the lighting device 100 as an LED tube, TLED, 300. A LED, Light Emitting Diode, is a solid semiconductor device that can convert electric energy into visible light. The LED may be controlled conveniently, and the light intensity and/or color of light may be regulated at will only by adjusting a current. LEDs have different light color configurations, and various light color effects may be achieved by adjusting light intensities of LEDs with different light colors. LEDs have been widely applied to various types of lighting devices, such as a battery-powered flashlight, a mini-sized sound control lamp, a safety flare, illuminating lamps for roadways and indoor stairs, and building and marker continuous lighting lamps.

The lighting device 300 comprises two end caps 302 and a sensing device 340. The sensing device 340 may be a magnetically operable switch, e.g., the reed contact switch, or an RFID/NFC reader. A key card 350 is arranged for generating a field 351. The housing of the lighting device 300 provides a region to receive the key card 350; and the sensing device 340 is arranged for sensing the field 351 when the key card 350 is provided in the housing of the lighting device 300. When the key card 350 is received and it is e.g. within a predetermined distance d from the center of the sensing device 340, as shown by the line 360, the strength of the field 351 sensed by the sensing device 340 at least reaches the threshold value or becomes higher than the threshold value, to trigger the sensing device 340 to generate a signal indicative of the presence of the field 351. In an example, when the sensing device 340 is a magnetically operable switch, e.g., the reed contact switch, the key card 350 is arranged for generating a magnetic field 351 and the generation of the signal indicative of the presence of the magnetic field 351 corresponds to the activation of the magnetically operable switch, e.g., the reed contact switch.

One of the advantages of using the magnetically operable switch, e.g. the reed contact switch, is that unwanted switching, e.g. a shopper intentionally or accidently switching the operational mode, can be avoided. The magnetically operable switch, e.g., the reed contact switch, can be mounted inside the lighting device 300 in such a way that the magnetically operable switch, e.g. the reed contact switch, is not visible and can only be activated with a magnetic key card 350.

Figure 4:
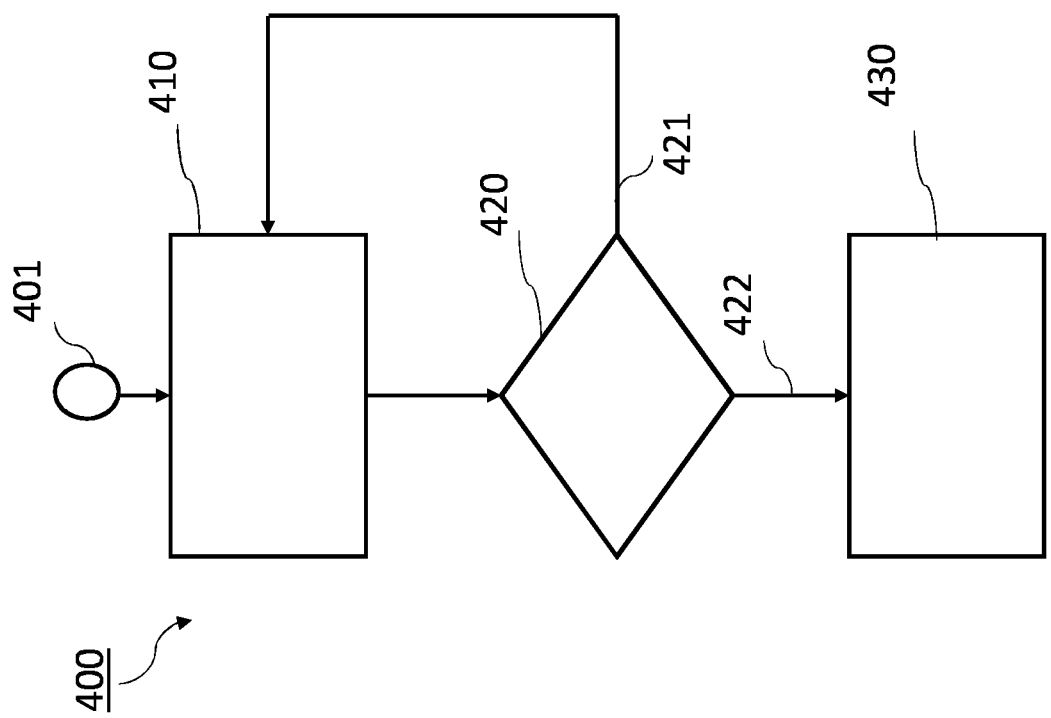
FIG. 4 shows a flowchart illustrating an embodiment of a method for highlighting a product using the lighting device as shown in FIG. 1.

FIG. 4 shows a flow diagram of the method for highlighting the first product 210 over the second product 220, respectively, placed in a first section 231 and the second section 232 of the store display 230 to draw a shopper's attention to the first product 231.

Step 401 shows the start of the flow diagram.

In step 410, the first segment 110 and the second segment 120 are arranged for providing the first light output 111 and the second light output 121 for illuminating the first product 210 and the second product 220 respectively.

In step 420, the sensing device 140 is arranged for sensing the field. In an embodiment, the sensing device 140 is a magnetically operable switch, e.g., the reed contact switch which is arranged for sensing the magnetic field and further arranged for generating the signal indicative of the presence of the field. Alternatively, the sensing device 140 is a radio-frequency identification, RFID, reader, which uses an electromagnetic field to automatically identify RFID tags. As an example of an RFID reader, the sensing device 140 may be a near-field communication (NFC) reader. When the sensing device 140 senses the field, it is arranged for generating the signal indicative of the presence of the field, represented by arrow 422, and move to the next step 430. Else the sensing device 140 continues in the state of sensing, represented by arrow 421.

In step 430, the controller 130 is arranged for changing the operational mode of the lighting device 100 from the normal lighting mode to the highlighting mode based on the signal indicating the presence of the field; wherein in both the normal lighting mode and the highlighting mode, the first segment 110 and the second segment 120 provide illumination, and wherein in the highlighting mode, the first segment 110 highlights the first product 210 over the second product 220.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A lighting device for highlighting a first product over a second product placed in a first and a second section respectively of a store fixture, display or shelf to draw a shopper's attention to the first product, the lighting device comprising:
   a first segment arranged for providing a first light output for illuminating the first product,
   a second segment, adjacent to the first segment, arranged for providing a second light output for illuminating the second product,
   wherein the lighting device is comprised in a housing, the housing arranged for attaching the lighting device to the store fixture, display or shelf such that the light emitted by the first segment reflects of at least a shopper facing portion of the first product,
   a sensing device arranged for sensing a magnetic field and to generate a signal indicative of the presence of the magnetic field, wherein the sensing device is a magnetically operable switch, and
   wherein the housing provides a region to receive a magnetic key card; and the sensing device is arranged for sensing the magnetic field when the magnetic key card is provided in the housing, and the generation of the signal, by the magnetic key card, indicative of the presence of the magnetic field corresponds to the activation of the magnetically operable switch;
   a controller arranged for changing an operational mode of the lighting device from a normal lighting mode to a highlighting mode based on the signal indicating presence of the magnetic field;
   wherein in both the normal lighting mode and the highlighting mode, the first segment and the second segment provide illumination, and wherein in the highlighting mode, the first segment highlights the first product over the second product.

2. The lighting device according to claim 1, wherein the controller is arranged for, when the lighting device is operating in the highlighting mode, modifying an intensity of the light output of the first segment.

3. The lighting device according to claim 1, wherein the controller is arranged for, when the lighting device is operating in the highlighting mode, modifying a color of the light output of the first segment.

4. The lighting device according to claim 1, wherein the sensing device is arranged for sensing at least one or more of the strength of the field, change of the strength of the field in a time period, interval of presence of the field.

5. A store fixture, display or shelf, comprising:
   a first section and a second section for holding a first product and a second product respectively; and
   a lighting device according to claim 1.

6. A method for highlighting a first product over a second product placed in a first and a second section respectively of a store fixture, display or shelf to draw a shopper's attention to the first product, the method comprising:
   providing a first light output by a first segment of a lighting device for illuminating the first product,
   providing a second light output by a second segment of the lighting device, adjacent to the first segment, for illuminating the second product, wherein the lighting device is comprised in a housing, the housing arranged for attaching the lighting device to the store fixture, display or shelf such that the light emitted by the first segment reflects of at least a shopper facing portion of the first product, sensing a magnetic field via a sensing device and, based on said sensing, generating a signal indicative of the presence of the magnetic field; wherein the sensing device is a magnetically operable switch, and wherein the housing provides a region to receive a magnetic key card; and the sensing device is arranged for sensing the magnetic field when the magnetic key card is provided in the housing, and the generation of the signal, by the magnetic key card, indicative of the presence of the magnetic field corresponds to the activation of the magnetically operable switch; and changing an operational mode of the lighting device from a normal lighting mode to a highlighting mode based on the signal indicative of the presence of the magnetic field;

wherein in both the normal lighting mode and the highlighting mode, the first segment and the second segment provide illumination, and wherein in the highlighting mode, the first segment highlights the first product over the second product.

7. A non-transitory computer readable medium comprising a computer program product comprising instructions configure to cause one or more processors associated with a computing system to execute the steps of claim 6.

* * * * *